(12) United States Patent
Hamana et al.

(10) Patent No.: US 10,164,495 B2
(45) Date of Patent: Dec. 25, 2018

(54) MOTOR-DRIVEN FLUID MACHINE

(71) Applicant: KABUSHIKI KAISHA TOYOTA JIDOSHOKKI, Kariya-shi, Aichi-ken (JP)

(72) Inventors: Shozo Hamana, Kariya (JP); Hiroshi Fukasaku, Kariya (JP); Taku Adaniya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 142 days.

(21) Appl. No.: 15/465,701

(22) Filed: Mar. 22, 2017

(65) Prior Publication Data
US 2017/0279325 A1  Sep. 28, 2017

(30) Foreign Application Priority Data

Mar. 25, 2016 (JP) .................. 2016-062128

(51) Int. Cl.
| | |
|---|---|
| H02K 11/00 | (2016.01) |
| H02K 3/28 | (2006.01) |
| F04C 18/02 | (2006.01) |
| F04C 29/00 | (2006.01) |
| H02K 5/16 | (2006.01) |
| H02K 3/50 | (2006.01) |
| H02K 3/52 | (2006.01) |
| H02K 11/33 | (2016.01) |
| H02K 5/173 | (2006.01) |

(52) U.S. Cl.
CPC ........... *H02K 3/28* (2013.01); *F04C 18/0215* (2013.01); *F04C 29/0085* (2013.01); *H02K 3/50* (2013.01); *H02K 3/522* (2013.01); *H02K 5/16* (2013.01); *H02K 11/33* (2016.01); *F04C 2210/26* (2013.01); *F04C 2240/30* (2013.01); *F04C 2240/40* (2013.01); *F04C 2240/60* (2013.01); *H02K 5/1732* (2013.01)

(58) Field of Classification Search
CPC ........ H02K 3/28; H02K 3/38; F04C 18/0215; F04C 29/0085
USPC ........................................... 310/71
See application file for complete search history.

(56) References Cited

U.S. PATENT DOCUMENTS

| | | | | |
|---|---|---|---|---|
| 5,762,526 A | * | 6/1998 | Kuramoto | F04C 23/008 439/874 |
| 9,419,491 B2 | * | 8/2016 | Egami | H02K 3/50 |

(Continued)

FOREIGN PATENT DOCUMENTS

JP    2014-034918 A    2/2014

*Primary Examiner* — Hanh Nguyen
(74) *Attorney, Agent, or Firm* — Sughrue Mion, PLLC (57) ABSTRACT

A motor-driven fluid machine has three motor wires. The innermost one of the three motor wires in the radial direction of a rotary shaft on a specific section of an outer end portion of a coil end is defined as a first motor wire. The first motor wire has a first extension, which extends from an inner side toward an outer side in the radial direction of the rotary shaft at a position between the specific section and a downstream side in the extending direction of the motor wires, and a second extension, which is continuous from the first extension and extends from the outer side toward the inner side in the radial direction of the rotary shaft to be connected to a corresponding conductive member.

5 Claims, 4 Drawing Sheets

(56) References Cited

U.S. PATENT DOCUMENTS

| | | | | |
|---|---|---|---|---|
| 2009/0315418 | A1* | 12/2009 | Hasegawa | F04C 18/0238 |
| | | | | 310/71 |
| 2011/0278972 | A1* | 11/2011 | Kaiser | H02K 3/12 |
| | | | | 310/71 |
| 2014/0044573 | A1 | 2/2014 | Fukasaku et al. | |
| 2014/0375157 | A1* | 12/2014 | Taguchi | F04B 35/04 |
| | | | | 310/71 |
| 2015/0028712 | A1* | 1/2015 | Horiba | H02K 3/38 |
| | | | | 310/195 |
| 2015/0303762 | A1* | 10/2015 | Hagita | F04C 23/008 |
| | | | | 310/71 |
| 2016/0036280 | A1* | 2/2016 | Matt | H02K 3/28 |
| | | | | 310/71 |

* cited by examiner

MOTOR-DRIVEN FLUID MACHINE

BACKGROUND OF THE INVENTION

The present invention relates to a motor-driven fluid machine having an electric motor that rotates a rotary shaft and a drive circuit that drives the electric motor.

Japanese Laid-Open Patent Publication No. 2014-34918, for example, discloses a motor-driven compressor including a compressing portion, which is driven through rotation of a rotary shaft to compress refrigerant. The housing of the motor-driven compressor accommodates the compressing portion and an electric motor. The electric motor includes a stator, which is fixed to an inner peripheral surface of the housing, and a rotor, which is rotated integrally with the rotary shaft. The stator has a cylindrical stator core and a U-phase coil, a V-phase coil, and a W-phase coil, which are wound around the stator core. An annular coil end projects from an end face of the stator core at an end with respect to the axial direction of the rotary shaft. Three motor wires corresponding to the U-phase, V-phase, and W-phase coils are routed out of the coil end. A drive circuit has circuit wires, each of which is electrically connected to the corresponding one of the motor wires.

The housing accommodates an insulating cluster block, which accommodates conductive members that establish electrical connection between the motor wires and the circuit wires. Each of the motor wires is electrically connected to the corresponding one of the conductive members. The motor wires are thus electrically connected to the corresponding circuit wires through the corresponding conductive members. The drive circuit is thus allowed to supply electric power to the electric motor through the circuit wires, the conductive members, and the motor wires, thus driving the electric motor. This rotates the rotary shaft to drive the compressing portion, thus compressing refrigerant by means of the compressing portion.

Figure 4:
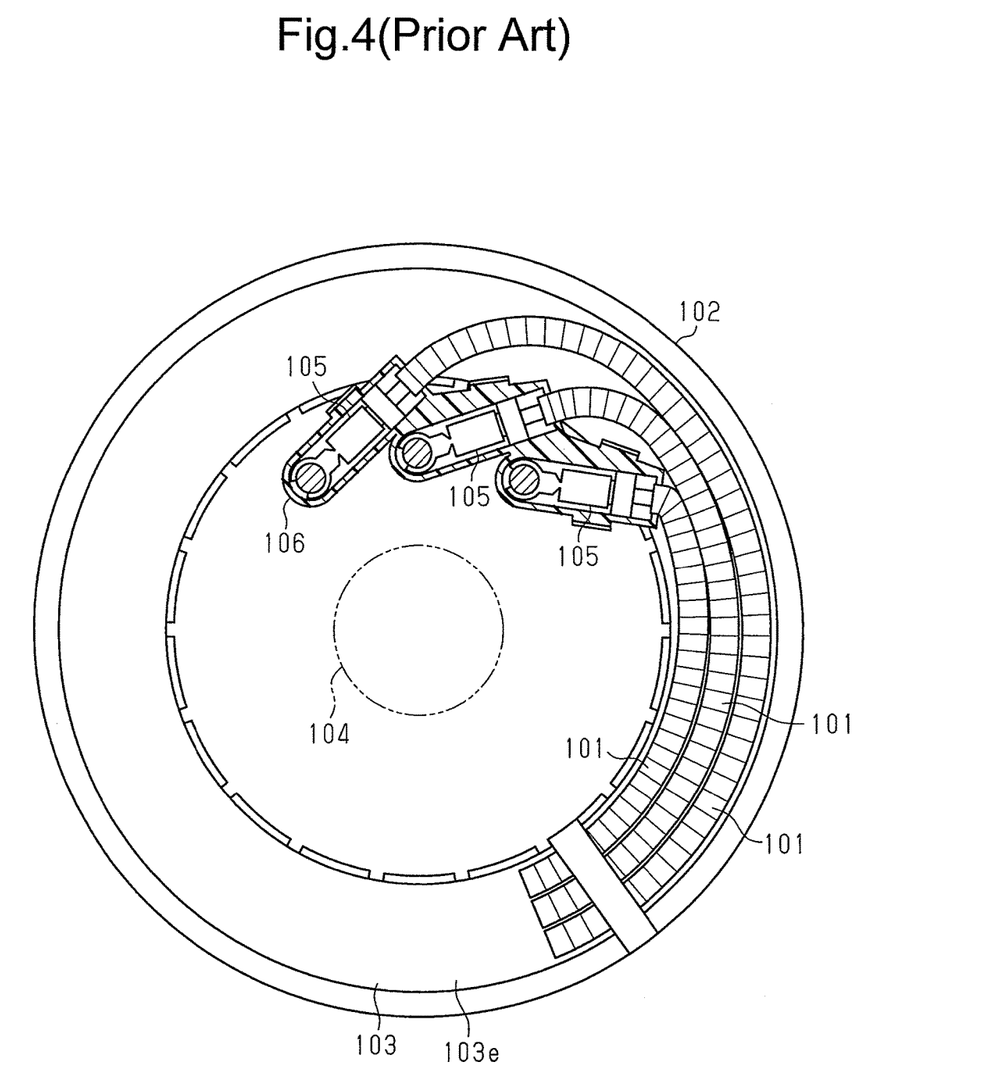
FIG. 4 is a front view showing a stator core of a conventional motor-driven compressor.

As illustrated in FIG. 4, to avoid interference between three motor wires 101 and components located inside a stator core 102 (such as a rotary shaft 104 and a bearing portion), the motor wires 101 may each be routed to extend in a circumferential direction of the rotary shaft 104 on an outer end portion 103e of a coil end 103, which is located at an end with respect to the axial direction of the rotary shaft 104. The motor wires 101 face the same direction while extending in the circumferential direction of the rotary shaft 104 from the coil end 103. To minimize the projecting dimension of the motor wires 101 outward in the axial direction of the rotary shaft 104 from the outer end portion 103e of the coil end 103, parts of the motor wires 101 are located adjacently in the radial direction of the rotary shaft 104 in some cases.

To reduce the size of the motor-driven compressor in the radial direction and the axial direction of the rotary shaft 104, a cluster block 106 is arranged on the stator core 102, at times, the three conductive members 105 are located inward in the radial direction of the rotary shaft 104 with respect to the coil end 103.

It is now assumed that, in the sections of the motor wires 101 located adjacently in the radial direction of the rotary shaft 104, the innermost one of the motor wires 101 in the radial direction of the rotary shaft 104 extends in the circumferential direction of the rotary shaft 104 while being maintained in a state facing a section of the outer end portion 103e of the coil end 103 that is located inward in the radial direction of the rotary shaft 104. In this configuration, when connecting the motor wire 101 to the corresponding conductive member 105, an end of the motor wire 101 corresponding to the conductive member 105 is bent at an acute angle toward the conductive member 105 in some cases. This is likely to increase the load (stress) on the motor wire 101.

SUMMARY OF THE INVENTION

Accordingly, it is an objective of the present invention to provide a motor-driven fluid machine capable of restraining load from being applied to a motor wire.

To achieve the foregoing objective and in accordance with one aspect of the present invention, a motor-driven fluid machine is provided that includes a housing, a rotary shaft accommodated in the housing, an electric motor accommodated in the housing to rotate the rotary shaft, a drive circuit that drives the electric motor, a cylindrical stator core that configures a section of the electric motor, U-phase, V-phase, and W-phase coils wound around the stator core, an annular coil end projecting from an end face of the stator core at an end with respect to an axial direction of the rotary shaft, three motor wires routed out of the coil end in correspondence with the U-phase, V-phase, and W-phase coils, three circuit wires provided to the drive circuit, three conductive members electrically connected to the corresponding motor wires and the corresponding circuit wires, and an insulating cluster block that is accommodated in the housing and accommodates the conductive members. The coil end has an outer end portion at an end with respect to the axial direction of the rotary shaft. The three motor wires extend in a circumferential direction of the rotary shaft on the outer end portion and are routed out of the coil end such that the motor wires face the same direction while extending in the circumferential direction of the rotary shaft. Part of the outer end portion faces the motor wires and is defined as a facing part. The motor wires are arranged adjacently in the radial direction of the rotary shaft on a specific section of the facing part. The three conductive members are located inward in the radial direction of the rotary shaft with respect to the coil end. The innermost one of the three motor wires in the radial direction of the rotary shaft on the specific section is defined as a first motor wire. The first motor wire includes a first extension and a second extension. The first extension extends from an inner side toward an outer side in a radial direction of the rotary shaft at a position between the specific section and a downstream side in an extending direction of the motor wires. The second extension is continuous from the first extension and extends from the outer side toward the inner side in the radial direction of the rotary shaft to be connected to the corresponding one of the conductive members.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A motor-driven fluid machine according to one embodiment will now be described with reference to FIGS. 1 to 3. In this embodiment, the motor-driven fluid machine is a motor-driven compressor 10 used in a vehicle air conditioner.

Figure 1:
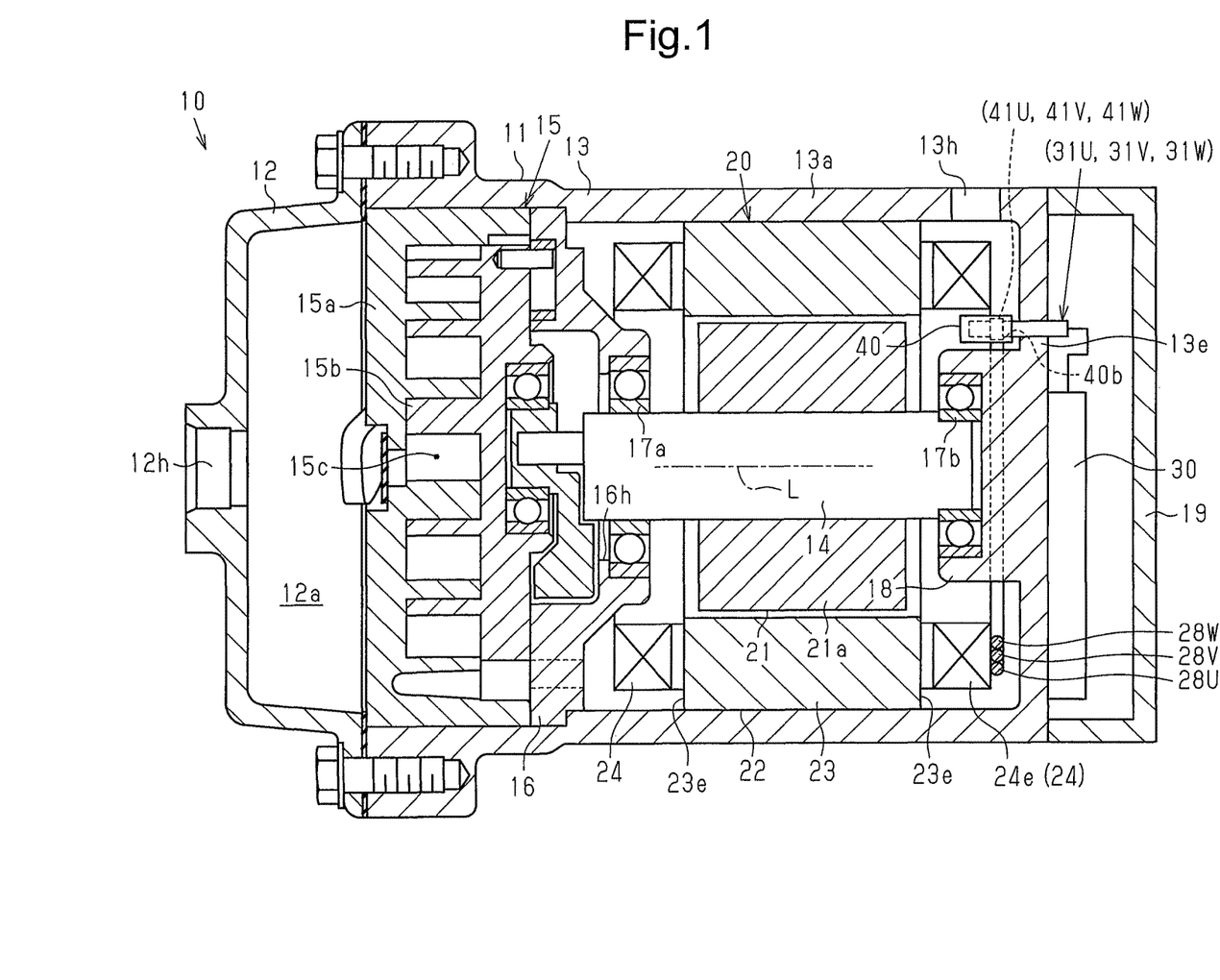
FIG. 1 is a cross-sectional side view showing a motor-driven compressor according to one embodiment.

As illustrated in FIG. 1, a housing 11 of the motor-driven compressor 10 has a cylindrical discharge housing member 12 with a closed end, and a cylindrical motor housing member 13 with a closed end. The motor housing member 13 is coupled to the discharge housing member 12. The discharge housing member 12 and the motor housing member 13 are made of metal such as aluminum. The motor housing member 13 has a bottom wall 13e and a side wall 13a, which extends in a cylindrical shape from an outer peripheral end of the bottom wall 13e. A suction port 13h is provided in the side wall 13a. The suction port 13h is connected to a non-illustrated external refrigerating circuit. A discharge chamber 12a is provided in the discharge housing member 12. A discharge port 12h, which communicates with the discharge chamber 12a, is provided in the discharge housing member 12. The discharge port 12h is connected to the external refrigerant circuit.

A rotary shaft 14 is accommodated in the motor housing member 13. A compressing portion 15, which compresses refrigerant through rotation of the rotary shaft 14, and an electric motor 20, which rotates the rotary shaft 14, are also accommodated in the motor housing member 13. The compressing portion 15 and the electric motor 20 are located adjacently in the extending direction of the rotational axis L (the axial direction) of the rotary shaft 14. In this description, being located or arranged adjacently refers to a case in which two members are arranged side by side. The electric motor 20 is located between the compressing portion 15 and the bottom wall 13e of the motor housing member 13.

A shaft support member 16 is arranged between the compressing portion 15 and the electric motor 20 in the motor housing member 13. An insertion hole 16h, through which one end, or a first end, of the rotary shaft 14 is inserted, is provided in a central section of the shaft support member 16. A bearing 17a is arranged between the insertion hole 16h and the first end of the rotary shaft 14. The first end of the rotary shaft 14 is rotationally supported by the shaft support member 16 with the bearing 17a.

A cylindrical bearing portion 18 projects from the bottom wall 13e of the motor housing member 13. The end, or a second end, of the rotary shaft 14 is inserted in the bearing portion 18. A bearing 17b is arranged between the bearing portion 18 and the second end of the rotary shaft 14. The second end of the rotary shaft 14 is rotationally supported by the bearing portion 18 with the bearing 17b.

The compressing portion 15 has a fixed scroll 15a, which is fixed to the motor housing member 13, and a movable scroll 15b, which is arranged to face the fixed scroll 15a. The fixed scroll 15a and the movable scroll 15b are meshed with each other. A compression chamber 15c, which has a variable volume, is defined between the fixed scroll 15a and the movable scroll 15b.

Refrigerant is drawn into the motor housing member 13 through the suction port 13h and then into the compression chamber 15c through orbiting motion (drawing operation) of the movable scroll 15b. The refrigerant in the compression chamber 15c is then compressed through orbiting motion (discharging operation) of the movable scroll 15b and discharged into the discharge chamber 12a. After being discharged into the discharge chamber 12a, the refrigerant flows out to the external refrigerant circuit through the discharge port 12h and returns into the motor housing member 13 through the suction port 13h.

A cylindrical cover member 19 with a closed end is attached to the bottom wall 13e of the motor housing member 13. A drive circuit 30, which drives the electric motor 20, is accommodated in the space defied by the bottom wall 13e of the motor housing member 13 and the cover member 19. The compressing portion 15, the electric motor 20, and the drive circuit 30 are arranged adjacently, in this order, along the rotary axis L of the rotary shaft 14.

The electric motor 20 includes a rotor 21, which rotates integrally with the rotary shaft 14, and a stator 22, which surrounds the rotor 21. The rotor 21 has a rotor core 21a, which is secured to the rotary shaft 14, and permanent magnets (not shown) arranged in the rotor core 21a. The stator 22 has a cylindrical stator core 23 and coils 24, which is wound around the stator core 23. Annular coil ends project from opposite end faces 23e of the stator core 23, which are located at ends in the axial direction of the rotary shaft 14. A part of the bearing portion 18 is received in the inner side of a coil end 24e, which is the one of the coil ends facing the bottom wall 13e of the motor housing member 13. In other words, the part of the bearing portion 18 is located to overlap with the coil end 24e as viewed in the radial direction of the rotary shaft 14.

Figure 2:
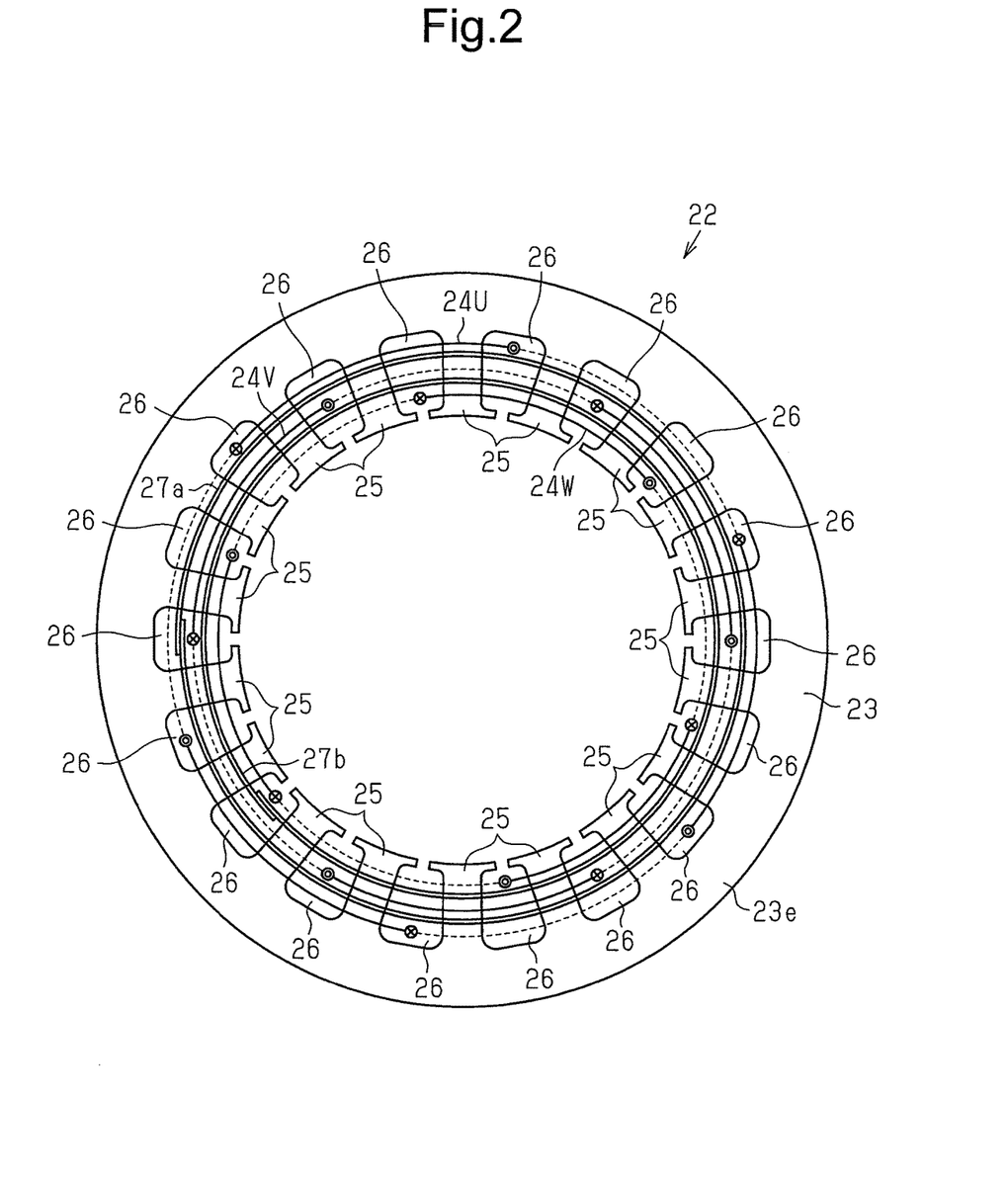
FIG. 2 is a schematic diagram representing wave winding.

With reference to FIG. 2, the stator core 23 has teeth 25, which are arranged adjacently in the circumferential direction of the rotary shaft 14. A slot 26 is located between each adjacent teeth 25 in the circumferential direction of the rotary shaft 14, respectively. The slots 26 are spaced apart by equal pitches in the circumferential direction of the rotary shaft 14. The coils 24 are wound in a wave winding manner to be received in the slots 26. The parts of the coil 24 that are located in the slots 26 are separated from the inner wall surfaces of the slots 26 by non-illustrated insulating sheets.

The coils 24 include a U-phase coil group 24U, which is passed through every third one of the slots 26 in the circumferential direction of the rotary shaft 14. The coils 24 also include a V-phase coil group 24V, which is arranged adjacent to the U-phase coil group 24U in the circumferential direction of the rotary shaft 14 and passed through every third one of the slots 26 in the circumferential direction of the rotary shaft 14. The coils 24 further include a W-phase coil group 24W, which is arranged between the U-phase coil group 24U and the V-phase coil group 24V and passed through every third one of the slots 26 in the circumferential direction of the rotary shaft 14.

In FIG. 2, the solid line sections of each of the U-phase, V-phase, and W-phase coil groups 24U, 24V, and 24W are the sections routed on one of the opposite end faces 23e of the stator core 23 in the axial direction of the rotary shaft 14. The broken line sections of each of the U-phase, V-phase, and W-phase coil groups 24U, 24V, and 24W are the sections routed on the other one of the opposite end faces of the stator core 23 in the axial direction of the rotary shaft 14 (not shown). The sections of each of the U-phase, V-phase, and W-phase coil groups 24U, 24V, and 24W between the corresponding solid line sections and broken line sections are the sections passed through the corresponding ones of the slots 26.

Each of the U-phase, V-phase, and W-phase coil groups 24U, 24V, and 24W has sections projecting from the opposite end faces of the stator core 23 in the axial direction of the rotary shaft 14. Each of the projecting sections is a coil end. The section of the U-phase coil group 24U corresponding to a coil end 24e is located outward in the radial direction of the rotary shaft 14 relative to the section of the V-phase coil group 24V corresponding to the coil end 24e. The section of the V-phase coil group 24V corresponding to the coil end 24e is located outward in the radial direction of the rotary shaft 14 relative to the section of the W-phase coil group 24W corresponding to the coil end 24e.

An annular insulating sheet 27a is arranged between the U-phase coil group 24U and the V-phase coil group 24V. An annular insulating sheet 27b is arranged between the V-phase coil group 24V and the W-phase coil group 24W.

Figure 3:
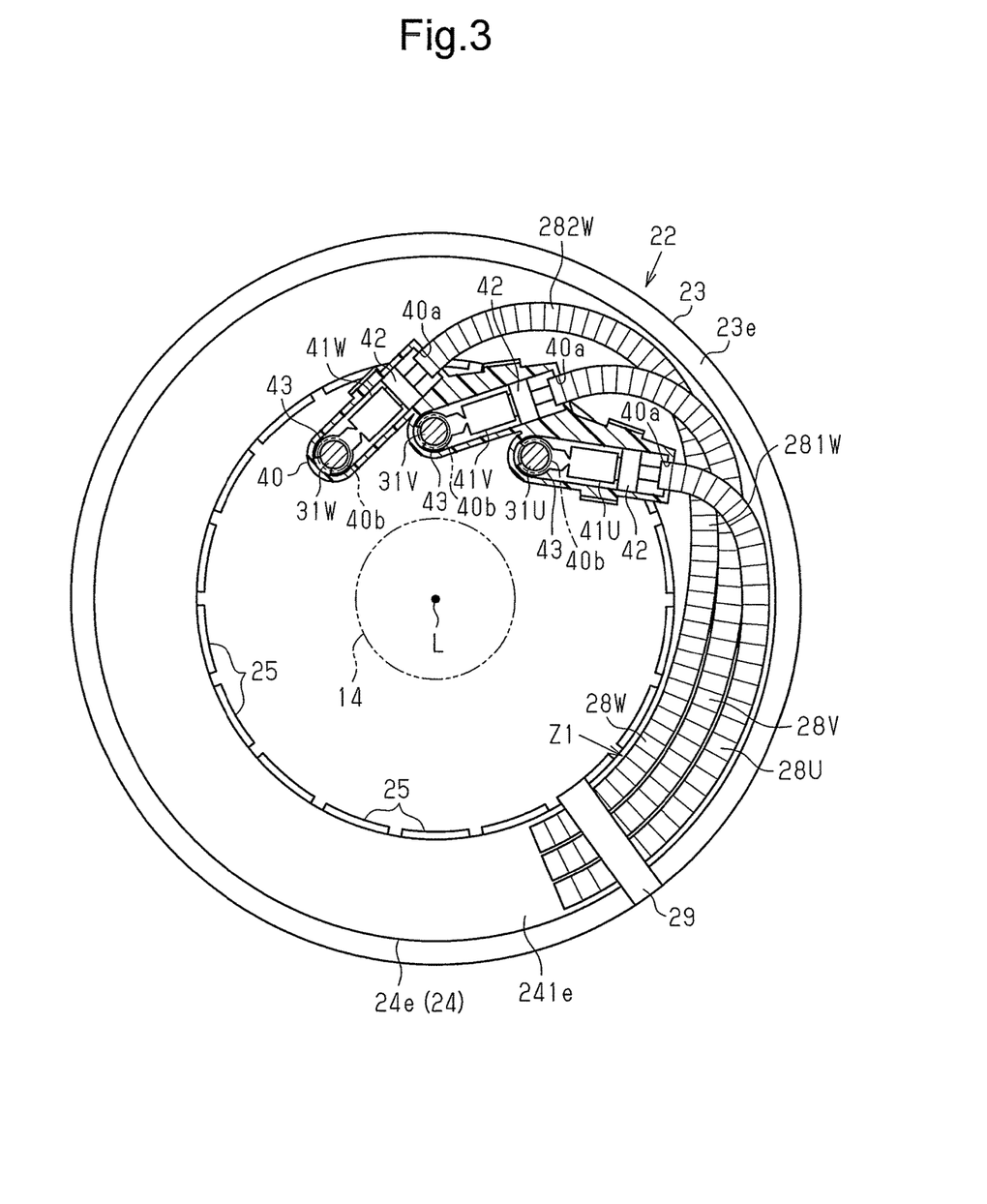
FIG. 3 is a front view showing a stator core.

As illustrated in FIG. 3, a section of the U-phase coil group 24U is referred to as a motor wire 28U that is routed out, in a state coated with an insulating film, from the one of the coil ends 24e facing the bottom wall 13e of the motor housing member 13. A section of the V-phase coil group 24V is referred to as a motor wire 28V that is routed out, in a state coated with an insulating film, from the coil end 24e. A section of the W-phase coil group 24W is referred to as a motor wire 28W that is routed out, in a state coated with an insulating film, from the coil end 24e. As a result, the three motor wires 28U, 28V, 28W are routed out of the coil end 24e in correspondence with the U-phase, V-phase, and W-phase coil groups 24U, 24V, and 24W. The motor wires 28U, 28V, 28W are routed out of the coil end 24e facing the bottom wall 13e of the motor housing member 13.

The position at which the U-phase motor wire 28U is routed out of the coil end 24e is located outward in the radial direction of the rotary shaft 14 relative to the position at which the V-phase motor wire 28V is routed out of the coil end 24e. The position at which the V-phase motor wire 28V is routed out of the coil end 24e is located outward in the radial direction of the rotary shaft 14 relative to the position at which the W-phase motor wire 28W is routed out of the coil end 24e. As a result, the positions at which the U-phase, V-phase, and W-phase motor wires 28U, 28V, and 28W are routed out of the coil end 24e are located offset in the radial direction of the rotary shaft 14 with respect to an outer end portion 241e of the coil end 24e, which is located at an end in the axial direction of the rotary shaft 14.

The three motor wires 28U, 28V, 28W extend in the circumferential direction of the rotary shaft 14 on the outer end portion 241e of the coil end 24e. Specifically, "extending in the circumferential direction of the rotary shaft 14" includes extending in the circumferential direction of the rotary shaft 14 while shifting in the radial direction of the rotary shaft 14.

The motor wires 28U, 28V, 28W are routed out of the coil end 24e to face the same direction while extending in the circumferential direction of the rotary shaft 14. Specifically, "facing the same direction while extending in the circumferential direction of the rotary shaft 14" indicates facing either clockwise or counterclockwise around the axis of the rotary shaft 14. In the present embodiment, the motor wires 28U, 28V, 28W extend counterclockwise from the coil end 24e.

Part of the outer end portion 241e of the coil end 24e faces the motor wires 28U, 28V, 28W, and is defined as a facing part. In the facing part of the outer end portion 241e, there exists a specific section Z1 on which the motor wires 28U, 28V, 28W are arranged adjacently in the radial direction of the rotary shaft 14 by being bound together using a binding portion 29, which is, for example, a wire tie. The specific section Z1 is thus defined as a section in which the motor wires 28U, 28V, 28W are arranged adjacently in the radial direction of the rotary shaft 14.

Specifically, the motor wires 28U, 28V, 28W are bound together by the binding portion 29 on the outer end portion 241e of the coil end 24e such that the U-phase motor wire 28U is located outward in the radial direction of the rotary shaft 14 relative to the V-phase motor wire 28V and that the V-phase motor wire 28V is located outward in the radial direction of the rotary shaft 14 relative to the W-phase motor wire 28W. As a result, the W-phase motor wire 28W is a first motor wire, which is located innermost of the three motor wires 28U, 28V, 28W in the radial direction of the rotary shaft 14 on the specific section Z1 of the outer end portion 241e of the coil end 24e.

With reference to FIG. 1, the drive circuit 30 has three circuit wires 31U, 31V, and 31W in correspondence with the U-phase, V-phase, and W-phase coil groups 24U, 24V, and 24W. The circuit wires 31U, 31V, 31W extend from the drive circuit 30 into the motor housing member 13 through the bottom wall 13e of the motor housing member 13.

An insulating cluster block 40, which is made of plastic, is located in the motor housing member 13. Three conductive members 41U, 41V, 41W are accommodated in the cluster block 40 in correspondence with the U-phase, V-phase, and W-phase coil groups 24U, 24V, 24W. An end of each of the circuit wires 31U, 31V, 31W is arranged in the cluster block 40. Each of the circuit wires 31U, 31V, 31W is electrically connected to the corresponding one of the conductive members 41U, 41V, 41W.

As illustrated in FIG. 3, each of the conductive members 41U, 41V, 41W includes a motor wire connecting portion 42, to which the corresponding one of the motor wires 28U, 28V, 28W is connected, and a circuit wire connection portion 43, to which the corresponding one of the circuit wires 31U, 31V, 31W is connected. The motor wire connecting portions 42 of the conductive members 41U, 41V, 41W are located adjacently in the circumferential direction of the rotary shaft 14. The circuit wire connecting portions 43 of the conductive members 41U, 41V, 41W are located adjacently in the circumferential direction of the rotary shaft 14. The circuit wire connecting portions 43 are located inward in the radial direction of the rotary shaft 14 with respect to the coil end 24e. The motor wire connecting portions 42 are located inward in the radial direction of the rotary shaft 14 with respect to the coil end 24e.

The cluster block 40 has three first insertion holes 40a, into which the corresponding motor wires 28U, 28V, 28W are inserted. Each of the first insertion holes 40a extends in the radial direction of the rotary shaft 14 in correspondence with the location of the corresponding one of the motor wire connecting portions 42.

As represented by the circles of long dashed double-short dashed lines in FIG. 3, the cluster block 40 has three second insertion holes 40b, into which the circuit wires 31U, 31V, 31W are inserted. The second insertion holes 40b extend in the axial direction of the rotary shaft 14 in correspondence with the locations of the circuit wire connecting portions 43.

The motor wires 28U, 28V, 28W each extend to the cluster block 40 while being bent from an outer side to an inner side in the radial direction of the rotary shaft 14 with respect to the outer end portion 241e of the coil end 24e. Each of the motor wires 28U, 28V, 28W is inserted into the cluster block 40 through the corresponding one of the first insertion holes 40a and connected to the corresponding one of the conductive members 41U, 41V, 41W (the motor wire connecting portions 42).

Each of the circuit wires 31U, 31V, 31W is inserted into the cluster block 40 through the corresponding one of the second insertion holes 40b and connected to the corresponding one of the conductive members 41U, 41V, 41W (the circuit wire connecting portions 43).

Among the three conductive members 41U, 41V, 41W, the conductive member 41U corresponding to the U-phase coil group 24U is located most upstream in the extending direction of the motor wires 28U, 28V, 28W (on the most leading side in the extending direction). The conductive member 41V corresponding to the V-phase coil group 24V is located upstream in the extending direction of the motor wires 28U, 28V, 28W (on the leading side in the extending direction) relative to the conductive member 41W corresponding to the W-phase coil group 24W. As a result, the conductive member 41W corresponding to the W-phase coil group 24W is located most downstream in the extending direction of the motor wires 28U, 28V, 28W (on the most trailing side in the extending direction) among the three conductive members 41U, 41V, 41W. Specifically, a side relatively close to the outer end portion 241e from which the motor wires 28U, 28V, 28W are routed is defined as an upstream or leading side in the extending direction and a side relatively spaced from the outer end portion 241e is defined as a downstream or trailing side in the extending direction.

The W-phase motor wire 28W (the first motor wire), which is located innermost in the radial direction of the rotary shaft 14, on the sections of the motor wires 28U, 28V, 28W arranged adjacently in the radial direction of the rotary shaft 14 with respect to the outer end portion 241e of the coil end 24e, is connected to the conductive member 41W, which is located most downstream in the extending direction of the motor wires 28U, 28V, 28W among the three conductive members 41U, 41V, 41W. The W-phase motor wire 28W is the longest among the lengths of the motor wires 28U, 28V, 28W.

The W-phase motor wire 28W has a first extension 281W, which extends from an inner side toward an outer side in the radial direction of the rotary shaft 14, at a position between the specific section Z1 of the outer end portion 241e of the coil end 24e and a downstream (trailing) side in the extending direction. The W-phase motor wire 28W also has a second extension 282W, which is continuous from the first extension 281W and extends from the outer side toward the inner side in the radial direction of the rotary shaft 14 to be connected to the conductive member 41W. The first extension 281W and the second extension 282W are bent at different angles. The second extension 282W has a greater curvature than the first extension 281W.

The electric power controlled by the drive circuit 30 is supplied to the electric motor 20 through the circuit wires 31U, 31V, 31W, the conductive members 41U, 41V, 41W, and the motor wires 28U, 28V, 28W. This drives the electric motor 20.

Operation of the present embodiment will now be described.

For example, it is now assumed that the motor wire 28W, which is located innermost in the radial direction of the rotary shaft 14, extends in the circumferential direction of the rotary shaft 14 while being maintained in a state extending on the inner side in the radial direction of the rotary shaft 14 with respect to the outer end portion 241e of the coil end 24e. In this case, when connecting the motor wire 28W to the corresponding motor wire connecting portion 42, the end of the motor wire 28W corresponding to the motor wire connecting portion 42 becomes bent at an acute angle toward the motor wire connecting portion 42. This increases the load (stress) on the motor wire 28W.

To solve this problem, in the present embodiment, the motor wire 28W, which is located innermost in the radial direction of the rotary shaft 14 on the specific section Z1 of the outer end portion 241e of the coil end 24e, has the first extension 281W and the second extension 282W. That is, the motor wire 28W extends from the inner side toward the outer side in the radial direction of the rotary shaft 14 and then from the outer side toward the inner side in the radial direction of the rotary shaft 14 to be connected to the conductive member 41W. As a result, the motor wire 28W is connected to the conductive member 41W without bending the end of the motor wire 28W at the side corresponding to the conductive member 41W at an acute angle toward the conductive member 41W when connecting the motor wire 28W to the conductive member 41W. This restrains load from being applied to the motor wire 28W.

The above described embodiment achieves the following advantages.

(1) The W-phase motor wire 28W has the first extension 281W, which extends from the inner side toward the outer side in the radial direction of the rotary shaft 14, at the position between the specific section Z1 of the outer end portion 241e of the coil end 24e and the downstream side in the extending direction. The W-phase motor wire 28W also has the second extension 282W, which is continuous from the first extension 281W and extends from the outer side toward the inner side in the radial direction of the rotary shaft 14 to be connected to the conductive member 41W. The motor wire 28W thus extends from the inner side toward the outer side in the radial direction of the rotary shaft 14 and then from the outer side toward the inner side in the radial direction of the rotary shaft 14 to be connected to the conductive member 41W. As a result, the motor wire 28W is connected to the conductive member 41W without bending the end of the motor wire 28W corresponding to the conductive member 41W at an acute angle toward the conductive member 41W when connecting the motor wire 28W to the conductive member 41W. This restrains load from being applied to the motor wire 28W.

(2) The W-phase motor wire 28W is connected to the conductive member 41W, which is located most downstream in the extending direction of the motor wires 28U, 28V, 28W among the three conductive members 41U, 41V, 41W. This maximizes the length of the motor wire 28W in the extending direction, compared to, for example, a case in which the motor wire 28W is connected to the most upstream one of the three conductive members in the extending direction of the motor wires 28U, 28V, 28W. This ensures sufficient lengths of the first extension 281W and the second extension 282W, thus facilitating connection of the motor wire 28W to the conductive member 41W without bending the end of the motor wire 28W corresponding to the conductive member 41W at an acute angle toward the conductive member 41W when connecting the motor wire 28W to the conductive member 41W.

(3) A part of the bearing portion 18 is received in the inner side of the coil end 24e so as to overlap with the coil end 24e as viewed in the radial direction of the rotary shaft 14. This further reduces the size of the motor-driven compressor 10 in the axial direction of the rotary shaft 14, compared to a case in which the bearing portion 18 is not received in the inner side of the coil end 24e.

(4) The facing part of the outer end portion 241e of the coil end 24e faces the motor wires 28U, 28V, 28W, and the corresponding portions of the motor wires 28U, 28V, 28W are bound together by the binding portion 29 to be arranged adjacently in the radial direction of the rotary shaft 14 on the specific section Z1 of the facing part. This facilitates restraint of projection of the motor wires 28U, 28V, 28W outward in the axial direction of the rotary shaft 14 with respect to the outer end portion 241e of the coil end 24e. The size of the motor-driven compressor 10 is thus reduced in the axial direction of the rotary shaft 14.

(5) The coil 24 is wound in the wave winding manner to be received in the slots 26. Thus, the positions at which the U-phase, V-phase, and W-phase motor wires 28U, 28V, and 28W are routed out of the coil end 24e are located offset in the radial direction of the rotary shaft 14 with respect to the outer end portion 241e of the coil end 24e. In the case in which the coil 24 is wound in the wave winding manner to be received in the slots 26, the corresponding portions of the motor wires 28U, 28V, 28W are arranged adjacently in the radial direction of the rotary shaft 14 on the specific section Z1 of the facing part of the outer end portion 241e of the coil end 24e. In the present embodiment, the motor wire 28W, which is located innermost in the radial direction of the rotary shaft 14 on the specific section Z1 of the facing part of the outer end portion 241e of the coil end 24e, has the first extension 281W and the second extension 282W. This restrains load from being applied to the motor wire 28W.

The above described embodiment may be modified as follows.

In the illustrated embodiment, as long as the first extension 281W and the second extension 282W are provided, the motor wire 28W may be connected to the motor wire connecting portion of the most upstream one of the three conductive members in the extending direction of the motor wires 28U, 28V, 28W.

In the illustrated embodiment, the conductive members 41U, 41V, 41W do not necessarily have to be arranged adjacently in the circumferential direction of the rotary shaft 14. The conductive members 41U, 41V, 41W may be arranged at any suitable positions as long as the conductive members 41U, 41V, 41W are located inward in the radial direction of the rotary shaft 14 with respect to the coil end 24e.

In the illustrated embodiment, the motor wires are arranged such that the W-phase motor wire 28W is located innermost of the three motor wires 28U, 28V, 28W in the radial direction of the rotary shaft 14 on the specific section Z1 of the outer end portion 241e of the coil end 24e. However, the present invention is not restricted to such motor wire arrangement. The motor wires may be arranged such that, for example, the U-phase motor wire 28U is located innermost in the radial direction of the rotary shaft 14 on the specific section Z1 of the outer end portion 241e of the coil end 24e. Alternatively, the motor wires may be arranged such that, for example, the V-phase motor wire 28V is located innermost in the radial direction of the rotary shaft 14 on the specific section Z1 of the outer end 241e portion of the coil end 24e.

In the illustrated embodiment, the U-phase, V-phase, and W-phase coil groups 24U, 24V, and 24W may be wound in either a distributed winding manner or a concentrated winding manner to be received in the slots 26.

In the illustrated embodiment, the bearing portion 18 may be entirely received in the inner side of the coil end 24e.

In the illustrated embodiment, the bearing portion 18 does not necessary need to be received in the inner side of the coil end 24e.

In the illustrated embodiment, the compressing portion 15, the electric motor 20, and the drive circuit 30 do not necessarily have to be arranged adjacently in this order along the rotational axis L of the rotary shaft 14. For example, with the cover member 19 attached to the side wall 13a of the motor housing member 13, the drive circuit 30 may be accommodated in the space defined by the side wall 13a of the motor housing member 13 and the cover member 19.

In the illustrated embodiment, the compressing portion 15 is not restricted to the type configured by the fixed scroll 15a and the movable scroll 15b but may be modified to any suitable type such as a piston type or a vane type.

In the illustrated embodiment, the motor-driven compressor 10 is not restricted to use in a vehicle air conditioner but may be used in any other air conditioners.

In the illustrated embodiment, the motor-driven fluid machine is embodied as the motor-driven compressor 10, which compresses refrigerant. However, the motor-driven fluid machine is not restricted to the motor-driven compressor 10 but may be embodied as, for example, a pump employed to supply fluid under pressure.

Therefore, the present examples and embodiments are to be considered as illustrative and not restrictive and the invention is not to be limited to the details given herein, but may be modified within the scope and equivalence of the appended claims.

The invention claimed is:

1. A motor-driven fluid machine comprising:
a housing;
a rotary shaft accommodated in the housing;
an electric motor accommodated in the housing to rotate the rotary shaft;
a drive circuit that drives the electric motor;
a cylindrical stator core that configures a part of the electric motor;
U-phase, V-phase, and W-phase coils wound around the stator core;
an annular coil end projecting from an end face of the stator core at an end with respect to an axial direction of the rotary shaft;
three motor wires routed out of the coil end in correspondence with the U-phase, V-phase, and W-phase coils;
three circuit wires provided to the drive circuit;
three conductive members electrically connected to the corresponding motor wires and the corresponding circuit wires; and
an insulating cluster block that is accommodated in the housing and accommodates the conductive members, wherein
the coil end has an outer end portion at an end with respect to the axial direction of the rotary shaft,
the three motor wires extend in a circumferential direction of the rotary shaft on the outer end portion and are routed out of the coil end such that the motor wires face the same direction while extending in the circumferential direction of the rotary shaft,
part of the outer end portion faces the motor wires and is defined as a facing part,
the motor wires are arranged adjacently in the radial direction of the rotary shaft on a specific section of the facing part,
the three conductive members are located inward in the radial direction of the rotary shaft with respect to the coil end,
the innermost one of the three motor wires in the radial direction of the rotary shaft on the specific section is defined as a first motor wire, and
the first motor wire includes a first extension extending from an inner side toward an outer side in a radial direction of the rotary shaft at a position between the specific section and a downstream side in an extending direction of the motor wires, and a second extension that is continuous from the first extension and extends from the outer side toward the inner side in the radial direction of the rotary shaft to be connected to the corresponding one of the conductive members.

2. The motor-driven fluid machine according to claim 1, wherein the three conductive members are arranged adjacently in the circumferential direction of the rotary shaft, and the first motor wire is connected to the most downstream one of the conductive members in the extending direction of the motor wires.

3. The motor-driven fluid machine according to claim 1, wherein the housing has a bearing portion that rotationally supports the rotary shaft, and at least a part of the bearing portion is received in an inner side of the coil end.

4. The motor-driven fluid machine according to claim 1, wherein each of the coils is wound around the stator core in a wave winding manner.

5. The motor-driven fluid machine according to claim 1, wherein the motor-driven fluid machine is a motor-driven compressor configured to compress refrigerant.

\* \* \* \* \*